UNITED STATES PATENT OFFICE.

JOHN GODFREY DIETRICH, OF McMINNVILLE, OREGON.

PROCESS OF EXTRACTING MILK-SUGAR FROM WHEY.

1,201,027.      Specification of Letters Patent.      Patented Oct. 10, 1916.

No Drawing.      Application filed February 26, 1916. Serial No. 80,684.

*To all whom it may concern:*

Be it known that I, JOHN GODFREY DIETRICH, a citizen of the United States, and a resident of McMinnville, in the county of Yamhill and State of Oregon, have invented a new and Improved Process of Extracting Milk-Sugar from Whey, of which the following is a full, clear, and exact description.

My invention relates to a new product of manufacture which is particularly useful as an ingredient in the manufacture of a substitute for human milk. This product is intended to be used where milk sugar is a necessary or advantageous ingredient.

Whey that has been derived from either whole or skimmed milk is placed in a suitable air-tight container and heat is applied to a degree sufficiently above the point obtainable by boiling in the open air to coagulate or partially solidify the solids in the whey other than the sugar. The so-heated mass of whey is then cooled rapidly to a temperature of 60° Fahrenheit or less, to retard bacterial growth. The cooling mass is then filtered in any suitable device to separate the solids from the liquid. After the solids have been removed the remaining liquid is substantially milk in solution. This solution derived from the whey may be used directly, but preferably it is condensed *in vacuo* to a predetermined point depending on the percentage of the milk sugar it is desirable to obtain in the solution. The resulting solution is cooled and sterilized by placing it in hermetically sealed containers and applying heat to the containers in the usual way.

I claim:

1. The process of extracting milk sugar from whey, which consists in heating the whey under pressure, and with the exclusion of air, to a temperature sufficient to coagulate particles other than sugar present in the whey, cooling the so-heated whey sufficiently to retard bacterial growth, and filtering the so-cooled mass to remove the solid particles from the liquid.

2. The process of extracting milk sugar from whey, which consists in heating the whey in an air-tight container under pressure to a degree sufficiently above the point obtainable by boiling the whey in the open air to coagulate or partially solidify the solids in the whey other than the sugar, then cooling the so heated whey sufficiently to retard bacterial growth, and filtering the so-cooled whey to remove the solid particles from the liquid.

3. The process of extracting milk sugar from whey, which consists in heating the whey under pressure, in an air-tight container, to a degree sufficiently above the point obtainable by boiling the whey in the open air to coagulate or partially solidify the solids in the whey other than the sugar, cooling the so-heated whey sufficiently to retard bacterial growth, filtering the cooled whey to remove the solid particles from the liquid, and placing the liquid in hermetically sealed containers and sterilizing by the application of heat.

4. The process of extracting milk sugar from whey, which consists in heating the whey, within a closed container, with the exclusion of air to a degree sufficiently above the point obtainable by heating in the open air so as to coagulate or partially solidify the solids in the whey other than the sugar, cooling the so-heated mass to a temperature of 60° Fahrenheit or less to retard bacterial growth, filtering the solid particles from the liquid, raising the percentage of the milk sugar within the solution by condensing the solution *in vacuo*, and cooling, and then placing the solution in hermetically sealed containers and sterilizing same by the application of heat.

5. The process of extracting milk sugar from whey, which consists in heating the whey, within a closed container, to a degree sufficiently above the point obtainable by heating in the open air so as to coagulate or partially solidify the solids in the whey other than the sugar, cooling the so-heated mass to a temperature of 60° Fahrenheit or less to retard bacterial growth, filtering the solid particles from the liquid, raising the percentage of the milk sugar within the solution by condensing the solution *in vacuo* and then sterilizing by the application of heat.

In testimony whereof I have signed my name to this specification in the presence of two subscribing witnesses.

JOHN GODFREY DIETRICH.

Witnesses:
    F. T. GRAMMO,
    F. S. HICLEY.